United States Patent [19]

Walter et al.

[11] Patent Number: 5,266,602
[45] Date of Patent: Nov. 30, 1993

[54] EXPANDABLE STYRENE POLYMERS

[75] Inventors: Manfred Walter, Speyer; Wolfram Husemann, Neustadt; Dieter Naegele, Worms, all of Fed. Rep. of Germany

[73] Assignee: BASF Aktiengesellschaft, Ludwigshafen, Fed. Rep. of Germany

[21] Appl. No.: 795,150

[22] Filed: Nov. 20, 1991

[30] Foreign Application Priority Data

Nov. 29, 1990 [DE] Fed. Rep. of Germany ....... 4038043

[51] Int. Cl.$^5$ .............................. C08J 9/18; C08J 9/20
[52] U.S. Cl. ....................................... 521/56; 521/60; 521/96
[58] Field of Search .............................. 521/56, 60, 96

[56] References Cited

U.S. PATENT DOCUMENTS

| 2,744,291 | 5/1956 | Stastny et al. | 521/56 |
| 2,888,410 | 5/1959 | Buchholtz | 521/56 |
| 3,001,954 | 9/1961 | Buchholtz et al. | 521/56 |
| 3,386,926 | 6/1968 | Gavoret | 521/56 |
| 4,129,706 | 12/1978 | Keppler et al. | 521/56 |

FOREIGN PATENT DOCUMENTS

| 106129 | 4/1984 | European Pat. Off. |
| 3908238 | 9/1960 | Fed. Rep. of Germany |
| 3916602 | 12/1989 | Fed. Rep. of Germany |
| 3901329 | 7/1990 | Fed. Rep. of Germany |
| 3931862 | 4/1991 | Fed. Rep. of Germany |
| 3936596 | 5/1991 | Fed. Rep. of Germany |

*Primary Examiner*—Morton Foelak
*Attorney, Agent, or Firm*—Keil & Weinkauf

[57] ABSTRACT

An expandable styrene polymer comprising
a) a styrene polymer,
b) from 1 to 10% by weight, based on a), of a saturated $C_3$- to $C_6$-hydrocarbon as blowing agent, and, if desired,
c) conventional assistants in effective amounts, has a benzene content of less than 1 ppm and a styrene content of less than 2000 ppm.

4 Claims, No Drawings

EXPANDABLE STYRENE POLYMERS

The present invention relates to benzene-free expandable styrene polymers.

Commercially available expandable styrene polymers contain from about 10 to 100 ppm of benzene and are therefore unsuitable for certain applications, for example in medicine or for the packaging of foodstuffs.

It is an object of the present invention to drastically reduce the benzene content. Investigations showed that the expandable styrene polymer obtained has a benzene content of greater than from 10 to 20 ppm even if benzene-free styrene and benzene-free assistants are used.

We have found that, surprisingly, the benzene content is drastically reduced if the polymerization catalyst used in the preparation is a benzoyl-free peroxy compound having a half life period of 1 hour at from 120° to 135° C. An expandable styrene polymer prepared in this way has the further advantage of improved expandability.

The invention accordingly provides an expandable styrene polymer comprising
 a) a styrene polymer,
 b) from 1 to 10% by weight, based on a), of a saturated $C_3$- to $C_6$-hydrocarbon as blowing agent, and, if desired,
 c) conventional assistants in effective amounts, wherein the benzene content is less than 1 ppm and the styrene content is less than 2000 ppm.

The invention furthermore provides a process for the preparation of an expandable styrene polymer by polymerizing styrene, in the presence or absence of further comonomers, in aqueous suspension in the presence of from 0.1 to 1% by weight of styrene-soluble peroxy compounds as catalyst, the blowing agent and, if used, conventional additives being added before, during or after the polymerization, wherein the catalyst used is a benzoyl-free peroxy compound having a half life period of 1 hour at from 120° to 135° C., alone or in combination with a peroxy compound having a half life period of 1 hour at from 85° to 95° C., and the polymerization is carried out in such a manner that from 30 to 90% of the styrene polymerize at from 120° to 150° C., and wherein the residual styrene content in the polymer is less than 0.2%.

The principal component a) in the novel products is polystyrene and/or a styrene polymer containing at least 50% by weight, preferably at least 80% by weight, of copolymerized styrene. Examples of suitable comonomers are α-methyl styrene, ring-halogenated styrenes, ring-alkylated styrenes, acrylonitrile, esters of acrylic or methacrylic acid with alcohols having from 1 to 8 carbon atoms, N-vinylcarbazol, maleic acid and maleic anhydride. The styrene polymer advantageously contains a small amount of a branching agent in the copolymerized form, i.e. a compound containing more than 1, preferably 2, double bonds. The branching agent is generally used in an amount of from 0.005 to 0.1% by weight, based on styrene.

It is also possible to use mixes of different styrene polymers, as described, for example, in DE-A 39 01 329, 39 08 238, 39 36 596, 39 31 862 and 39 16 602.

Preference is given to styrene polymers having a viscosity number (0.5% strength in toluene at 25° C.) of from 55 to 85 [ml/g], preferably from 60 to 80 [ml/g], and a melt flow index MFI (190° C., 3.8 kp) of from 5 to 30 [g/10 min], preferably from 7.5 to 20 [g/10 min]. The melt flow index, which is greatly reduced compared with conventional styrene polymers having the same viscosity number, is characteristic of branched styrene polymers generally containing from 0.2 to 2.5, preferably from 0.2 to 1.0, branching points per 1000 monomer units.

The mean molecular weight of the styrene polymer is generally from 150,000 to 300,000, preferably from 180,000 to 270,000. The proportion having a molecular weight of less than 200,000 is generally from 30 to 80% by weight, preferably from 40 to 70% by weight. The components of the styrene polymer having a molecular weight of less than 200,000 advantageously contains from 0.25 to 3, preferably from 0.5 to 2.5, branches per 1000 monomer units.

The component having a molecular weight of greater than 200,000 can have a lower degree of branching, advantageously less than 0.5 branches per 1000 monomer units.

The expandable styrene polymer contains, as blowing agent b), from 1 to 10% by weight, preferably from 2 to 7% by weight, in particular from 3 to 6% by weight, based on a), of a saturated $C_3$- to $C_6$-hydrocarbon, such as propane, butane, isobutane, n-pentane, i-pentane, neopentane, cyclopentane and/or hexane. Preference is given to a commercially available pentane mixture.

As component c), the expandable styrene polymer may contain conventional assistants, such as dyes, pigments, fillers, stabilizers, flameproofing agents, synergists, nucleating agents, lubricants and the like in conventional effective amounts.

Suitable additives are also poly(2,6-di-methyl)-1,4-phenylene ether and poly-1,4-phenylene sulfide (cf. DE-A-39 04 370 and DE-A-39 24 868). These additives increase the heat resistance of the foam. Other suitable additives are styrene-soluble elastomers (cf. DE-A-39 15 602), which increase the elasticity of the foam.

Other suitable additives are finely divided organic polymers having a high water absorption capacity (cf. DE-A 40 14 261), which improve the free-flowing properties.

The expandable styrene polymers according to the invention are free or virtually free of benzene; the benzene content is less than 1 ppm, preferably less than 0.8 ppm. The styrene content is less than 2000 ppm, preferably less than 1000 ppm, in particular less than 800 ppm.

In a preferred process, the expandable styrene polymers according to the invention are prepared by polymerizing styrene, in the presence or absence of comonomers, in aqueous suspension, the above-described blowing agents and, if used, the additives being added before, during or after the polymerization.

It is essential to the invention that the catalyst used is from 0.1 to 1.0% by weight, preferably from 0.2 to 0.7% by weight, of a styrene-soluble, benzoyl-free peroxy compound having a half life period of 1 hour at from 120° to 135° C. The preferred catalyst is dicumyl peroxide. In addition, other conventional peroxy compounds having a half life period of 1 hour at from 85° to 95° C., such as dibenzoyl peroxide or tert-butyl peroxy-2-ethylhexanoate, may be used in addition, but the total amount of peroxy compounds should not exceed 1% by weight.

The polymerization processes used hitherto use tert-butyl perbenzoate as catalyst for completing the polymerization. It has now been found that this compound apparently partially decomposes to form benzene in the final polymerization phase and is thus responsible for the benzene content in expandable styrene polymers.

However, when benzoyl-free peroxy compounds are used according to the invention, the styrene cannot be successfully polymerized to completion at the temperature customary hitherto of about 120° C.

It is therefore essential to the invention to carry out the polymerization in such a manner that from 30 to 90% of the styrene employed polymerize at from 120° to 150° C. The polymerization mixture is kept at this high temperature until the styrene content in the polymer has dropped to less than 0.1%.

Surprisingly, the polymerization conditions according to the invention result in the formation of a styrene polymer which differs from that obtained by the conventional process by a reduced melt flow index at the same viscosity number. More detailed investigation showed that the styrene polymer has a significant content of branched molecules even if no monomers containing two or more double bonds had been used, and that the proportion of branches in the molecular weight range below 200,000 is particularly high.

It is usual to use from 0.005 to 1% by weight, preferably from 0.01 to 0.75% by weight, in particular from 0.02 to 0.5% by weight, of a regulator having a chain-transfer constant K of from 0.1 to 50, preferably from 1 to 30, as described in EP-B 106 129 and DE-A 39 21 148. Examples of suitable regulators are thiols, such as n-dodecyl mercaptan (K=19), tert-dodecyl mercaptan (K=3), n-butyl mercaptan (K=22) and tert-butyl mercaptan (K=3.6), and furthermore pentaphenylethane (K=2.0) and dimeric α-methylstyrene (K=0.5).

Suitable branching agents, which are generally used in amounts of from 0.001 to 0.1% by weight, preferably from 0.005 to 0.05% by weight, are monomers containing more than one, preferably two, polymerizable double bonds, such as butadiene, isoprene, vinylcyclohexene, vinyl acrylate, divinylbenzene, glycol dimethacrylate, butanediol diacrylate, butanediol dimethacrylate and hexanediol diacrylate. The regulator and branching agent are either introduced into the reactor before commencing the polymerization or alternatively added during the polymerization, for example at a conversion of from 20 to 80%. It is advantageous to introduce the regulator before commencing the polymerization and to delay addition of the branching agent until during the polymerization.

Simultaneous use of a regulator and branching agent gives a branched styrene polymer having a conventional molecular weight and a particularly high expansion capacity.

The styrene content in the expandable styrene polymers should generally be low and is usually less than 0.2% by weight, preferably less than 0.1% by weight, in particular less than 0.08% by weight. If the regulator used is a mercaptan, this aim is expediently achieved by delaying addition of the regulator until during the polymerization, at a conversion of from 20 to 90%.

The polystyrene particles according to the invention containing blowing agent are in the form of beads and generally have a diameter of from 0.2 to 4 mm. They can be pre-foamed by conventional methods, for example using steam, to give foam particles having a diameter of from 0.5 to 2 cm and a density of from 0.005 to 0.1 g/cm³. It is apparent that this significantly increases the throughput or allows the same throughput to be achieved using smaller amounts of blowing agent.

The prefoamed particles can then be foamed to completion by conventional methods to give foam moldings having a density of from 0.005 to 0.1 g/cm³.

In the examples, parts are by weight.

The mean molecular weight ($M_w$) of the styrene polymers is determined by gel permeation chromatography.

The degree of branching is also determined by gel permeation chromatography coupled on-line with a laser scattered light instrument, as described by R. C. Jordan, M. L. Connel, ACS Symposium Series No. 138 (1980), pp. 107-129, Size Exclusion Chromatography (GPC), Theodore Provder, Editor. The conversion into the ratio of the mean square radii of gyration of the branched and linear samples, which is necessary for characterization of the degrees of branching, is carried out by the method of M. Hoffmann, H. Krömer and R. Kuhn, Polymeranalytik I, Georg Thieme Verlag, Stuttgart, 1977. The degree of branching was determined by the method of B. H. Zimm and W. H. Stockmayer, J. Chem. Phys. 17 (1949), 1301, for the number of branching points n<5 at a functionality f=4.

The viscosity number VN (0.5% strength in toluene at 25° C.) was determined in accordance with DIN 53 726, and the melt flow index MFI (190° C., 3.8 kp) was determined in accordance with DIN 53 735, in each case using deaerated samples.

EXPANDABILITY

The expandability was investigated using a screen (mesh width: from 0.1 to 0.2 mm) measuring 1000×800×250 mm held by a metal frame and placed in a sealed metallic housing with steam inlet line and extractor.

The steam at 100° C. flowed into the prefoaming apparatus from below, passed through the wire mesh holding the products to be tested and escaped again through the extractor. Before the tests were commenced, the apparatus was first preheated for about 5 minutes. 100 g of expanded bead polymer having a particle diameter of from 1.0 to 2.0 mm were subsequently distributed uniformly on the wire mesh, the apparatus was sealed and the steam valve was opened. After a certain time, the steam valve was closed again and the metal housing was opened. The bulk density of the prefoamed material was subsequently determined. The table shows the minimum achievable bulk density and the prefoaming time necessary to achieve this.

EXAMPLES 1 TO 3 (COMPARISON)

A mixture of 150 parts of water, 0.1 part of sodium pyrophosphate, 100 parts of styrene, 0.15 part of dibenzoyl peroxide and 0.25% of tert-butyl perbenzoate was introduced into a pressure-tight stirred reactor and heated to 90° C. during the course of 2 hours with stirring. The amounts of regulator shown in the table were then added. The time of addition data are measured from commencement of the polymerization.

After the reaction mixture had been heated at 90° C. for 2 hours, 4 parts of a 10% strength aqueous solution of polyvinylpyrrolidone were added. The mixture was subsequently heated at 90° C. for a further 2 hours, at 100° C. for 2 hours and finally at 125° C. for 4 hours. The pentane (7.5 parts) and the other additives were added at the times and in the amounts given in the table.

The bead polymer obtained having a mean particle diameter of 1.2 mm was isolated, washed and dried.

EXAMPLES 4 TO 9

A mixture of 150 parts of water, 0.1 part of sodium pyrophosphate, 100 parts of styrene, 0.05 part of dibenzoyl peroxide and 0.3 part of dicumyl peroxide was introduced into a pressure-tight stirred reactor and heated to 110° C. over the course of 2.5 hours with stirring. The amounts of regulator and branching agents shown in the table were then added. The time of addition data are measured from commencement of polymerization. 3 parts of a 10% strength aqueous solution of polyvinylpyrrolidone were added 3 hours after commencement of the polymerization.

The mixture was subsequently heated to 130° C. over the course of 3.5 hours and stirred at this temperature for 3 hours. The pentane (7.5 parts) and the other additives were added at the times and in the amounts indicated in the table.

The bead polymer obtained having a mean particle diameter of 1.2 mm was isolated, washed and dried.

TABLE

| Example | 1 | 2 | 3 | 4 | 5 | 6 |
|---|---|---|---|---|---|---|
| Initiator 1 | DBP | DBP | DBP | DBP | DBP | DBP |
| Initiator 2 | TBP | TBP | TBP | DCP | DCP | DCP |
| Time of addition of pentane [h] | 4.7 | 4.7 | 4.7 | 4.1 | 4.1 | 4.1 |
| Pentane content [%] | 6.57 | 6.62 | 6.17 | 6.45 | 6.2 | 6.29 |
| Regulator | t-DM | t-DM | t-DM | t-DM | t-DM | t-DM |
| Amount of regulator [%] | 0.03 | 0.03 | 0.03 | 0.03 | 0.03 | 0.03 |
| Time of addition of regulator [h] | 4.7 | 4.7 | 4.7 | 4.7 | 4.1 | 4.1 |
| Branching agent |  |  |  | BDDA | BDDA |  |
| Amount of branching agent [%] |  |  |  | 0.02 | 0.01 |  |
| Time of addition of branching agent |  |  |  | 4.1 | 4.1 |  |
| Styrene content [%] | 0.086 | 0.078 | 0.093 | 0.041 | 0.039 | 0.061 |
| Benzene [ppm] | 41 | 38 | 36 | 0.6 | 0.5 | 0.23 |
| Viscosity No. [ml/g] | 76.3 | 78.6 | 77.9 | 76.8 | 78.8 | 75.4 |
| MFI (190° C., 3.8 kp) [g/10 min] | 3.5 | 3.8 | 3 | 8.8 | 8.5 | 7.3 |
| $M_w$ | 180,000 | 214,000 | 194,000 | 213,000 | 206,000 | 200,000 |
| Proportion having $M_w < 200,000$ [%] | 65 | 58 | 67 | 60 | 57 | 59 |
| Degree of branching (MW > 200,000) [Branching points per 1000 monomer units] | 0 | 0 | 0 | 0.15–0.55 | 0.10–0.50 | 0–0.30 |
| Degree of branching (MW < 200,000) [Branching points per 1000 monomer units] | 0 | 0 | 0 | 0.55–0.64 | 0.50–0.64 | 0.3–0.57 |
| Bulk density [g/l] | 10.6 | 11.4 | 11.6 | 10.2 | 10.6 | 10.6 |
| Foaming time [min] | 6 | 6 | 6 | 6 | 6 | 6 |

| Example | 7 | 8 | 9 |
|---|---|---|---|
| Initiator 1 | DBP | DBP | DBP |
| Initiator 2 | DCP | DCP | DCP |
| Time of addition of pentane [h] | 3.9 | 3.9 | 4 |
| Pentane content [%] | 6.28 | 6.33 | 6.24 |
| Regulator | t-DM | DMS | DMS |
| Amount of regulator [%] | 0.03 | 0.05 | 0.05 |
| Time of addition of regulator [h] | 3.9 | at Commencement | at commencement |
| Branching agent |  |  |  |
| Amount of branching agent [%] |  |  |  |
| Time of addition of branching agent |  |  |  |
| Styrene content [%] | 0.063 | 0.058 | 0.053 |
| Benzene [ppm] | 0.8 | 0.7 | 0.7 |
| Viscosity No. [ml/g] | 74.6 | 72 | 73.4 |
| MFI (190° C., 3.8 kp) [g/10 min] | 7.7 | 7.7 | 7.9 |
| $M_w$ | 194,000 | 193,000 | 199,000 |
| Proportion having $M_w < 200,000$ [%] | 63 | 61 | 60 |
| Degree of branching (MW > 200,000) [Branching points per 1000 monomer units] | 0–0.25 | 0–0.33 | 0–0.33 |
| Degree of branching (MW < 200,000) [Branching points per 1000 monomer units] | 0.25–0.60 | 0.33–0.60 | 0.33–0.68 |
| Bulk density [g/l] | 10.6 | 10.4 | 10 |
| Foaming time [min] | 6 | 6 | 6 |

DBP = dibenzoyl peroxide; TBP = tert-butyl perbenzoate; DCP = dicumyl peroxide; BDDA = butanediol diacrylate; t-DM = tert-dodecyl mercaptan; DMS = dimeric α-methylstyrene

We claim:

1. A process for the preparation of an expandable styrene polymer by polymerizing styrene in the presence of from 1 to 10% by weight of a saturated $C_3$ to $C_6$ hydrocarbon as blowing agent, in the presence or absence of further comonomers, in aqueous suspension and, optionally, conventional additives being added before, during or after the polymerization, wherein the catalyst used is a benzoyl-free peroxy compound having a half life period of 1 hour at from 120° to 135° C., alone or in combination with a peroxy compound having a half life period of 1 hour at from 85° to 95° C., and the polymerization is carried out in such a manner that from 30 to 90% of the styrene polymerizes at from 120° to 150° C. and wherein the residual styrene content in the polymer is less than 0.2%.

2. A process according to claim 1, wherein from 0.1 to 1.0% by weight of catalyst is employed.

3. A process according to claim 1, wherein from 0.2 to 0.7% by weight of catalyst is employed.

4. A process according to claim 3, wherein the benzoyl-free catalyst is dicumyl peroxide.

* * * * *